I. P. Tice,
Spirit Meter,
N°. 67,611.    Patented Aug. 6, 1867.
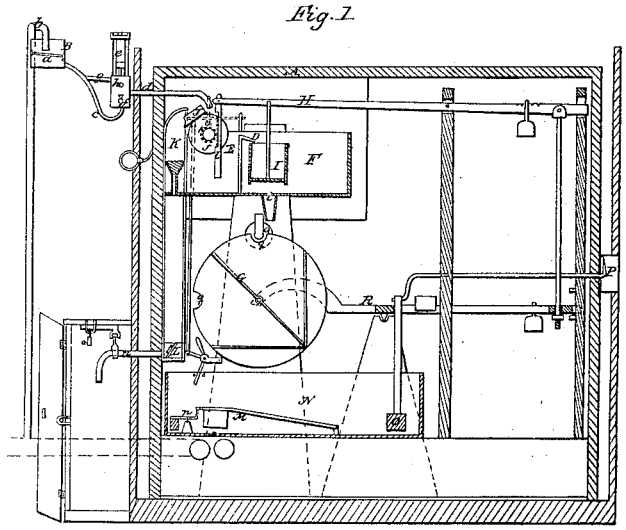
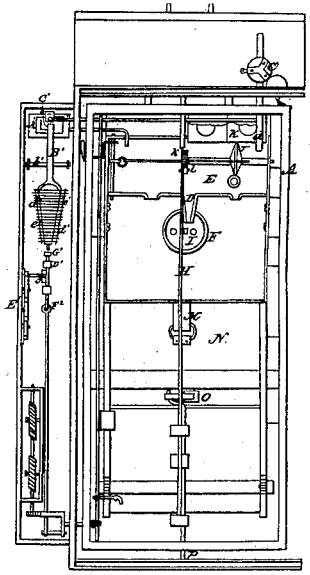
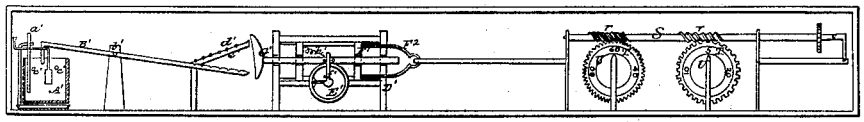
Witnesses:
John W. Coombs
Joseph Beesey
Inventor:
Isaac P. Tice

United States Patent Office.

ISAAC P. TICE, OF NEW YORK, N. Y.

Letters Patent No. 67,611, dated August 6, 1867.

---

IMPROVED SPIRIT-METER AND REGISTERING APPARATUS.

---

The Schedule referred to in these Letters Patent and making part of the same.

---

TO ALL WHOM IT MAY CONCERN:

Be it known that I, ISAAC P. TICE, of the city, county, and State of New York, have invented certain new and useful improvements on Spirit-Meters and Separators, of which the following is a full, clear, and exact description, reference being had to the accompanying drawing, forming part of this specification, and in which—

Figure 1 represents a longitudinal vertical section of an apparatus embracing my improvements.

Figure 2, a plan of the same with the upper main cover removed; and

Figure 3, a front elevation of (in part) a registering apparatus of quantities as applied to the meter; also of an apparatus for registering the specific gravity of the spirit or fluid passed through the meter.

Similar letters of reference indicate corresponding parts.

Heretofore it has been customary on attaching a measuring apparatus or meter to the worm of a still to provide an aperture in the worm, between the worm-tank and meter, to prevent the air which is expelled from the still at the commencement of a distilling process from actuating the measurer of the registering apparatus of the meter. This opening, being necessary to secure accuracy of the register, allows of abstraction of the spirit before it reaches the meter; also, when the discharge-orifice of a meter is obstructed, the spirit fills the casing which contains the meter, and is at liberty to pass out through said opening or blow-pipe connected therewith without giving any register of the amount of spirits passing from the still.

The first part of my invention has for its object the removal of these defects; and the nature of it consists in a novel attachment or connection of the meter, which may be of any suitable kind, to or with the worm of a still, whereby the air at the commencement of a distilling process may be expelled without any such exposed opening, and without operating the measurer; and whereby, through a valve and float, any undue accumulation of spirit, consequent, say, on stopping the discharge-orifice of the meter, will be restrained from passing or being drawn off without registration by the meter. The invention also consists in the employment of a transparent separator, arranged between the still and the meter, to show the flow of spirits, and facilitate their regulation, accordingly as high or low wines are being produced. Likewise, the invention embraces an overflow pipe or spout, for supplying, in a small and regular stream, the finishing quantity necessary to tilt or operate the measurer, the same acting, in connection with a valve worked by the meter, for previously shutting off the main supply to the measurer. Furthermore, the invention consists in a novel means of operating the sample-taker by each delivery of the measurer; also, of a check-valve in the sample-can pipe, or at foot of the can, to prevent the introduction of water into the cans from the exterior orifice, after, say, the sample from the can pipe has been inspected or tested. Also, said invention embraces a detecting-valve to (at any suitable point) the discharge from the meter, whereby any attempt to flood the meter by stoppage of the discharge will cause said valve to close and remain closed till the meter is opened for its readjustment. Likewise, the invention includes a float and dial for indicating any attempt at such tampering. Furthermore, to insure accuracy in weighing the quantity delivered by the measurer, the invention consists in the application of a roller or comparatively frictionless stop to—and for operation in connection with a peculiar construction of the tilting-can or measurer—hold the latter till properly filled, and then freely release it. In addition to these features, the invention includes a novel means of operating the registering apparatus of a meter, by means of a shaft having screw-threads on it of different pitch, made to gear with and drive correspondingly-pitched worm-wheels in separate connection, with index-hands for denoting on different dials the multiples of the quantities passed and registered by the meter. Likewise, a proof-tester or register, embracing the following peculiarities, namely, a pendent can or receiver, into which spirit is passed from the still on its way to the meter, (or otherwise suitably situated,) and operating, by the density or specific gravity of the liquid, to control the movements of a registering apparatus, indicating the specific gravity by a scale-beam carrying more or less weight as said beam rises or falls; and, in connection with such action, a thermometric attachment for adjusting the same as the temperature of the liquid varies. Likewise, certain means, consisting of an automatic or self-adjusting templet, whereby the variations in weight for a given volume, as affected by temperature and influencing the action of the beam, are made to correspondingly control or limit the registering apparatus of the specific gravity, the indication of which register, when taken in connection with the indications of quantities passed by or through the meter, gives an accurate result as regards the quantity of spirits passed at a given proof.

In describing my invention, as illustrated in the accompanying drawing, it will not be necessary here to refer minutely to those parts of the meter which are the subject-matter of previous inventions, such as the tilting measuring-can, where such a form of measurer is used. I shall, therefore, confine this description to the features of the invention as previously divided or classified.

The meter, of which A is the case, has its junction with the still established by or through a receiver, B, connected, at a point below a float-valve, a, arranged in it, with the worm outside of the worm-tank. This receiver is furnished with a blow-off pipe, b, communicating with it above the valve a, and connecting with the discharge pipe or other suitable outlet that shall give to it a close character. The pipe attachment of the receiver B to the meter is also made below the valve a, which latter should be so constructed as that, when down or open, it allows of the air expelled in commencing the distilling process to pass off by the blow-pipe b without operating the tilting-can or measurer; but on the meter and its case being flooded by tampering with it, by, say, stopping the discharge, the liquid rising in the receiver B lifts the valve a, and closes the blow-off pipe, thus shutting off egress therethrough. In this way may the objects specified as pertaining to the first feature of this invention be attained.

The second part of the invention is shown by the arrangement of a separator, C, between the still and meter, and which may be between the latter and receiver B, the connection being made by pipes c d. This separator may be wholly or only partially transparent, say at its upper portion e, for the purpose of allowing sight to be taken of the quality of the spirit being passed. The pipe c establishes junction through the separator with the supply pipe d to the meter, and should be provided with a cock, f. It may also have an air pipe, g, connecting it with the separator at top. The cock f serves to control the discharge of high wines to the meter, while low wines may be run back to the doubler, or elsewhere, by a pipe, h; or, by suitable cocks to said pipes, the low wines only may be worked, the transparent separator, which may be variously constructed, facilitating the running of high or low wines at option.

The third feature of the invention is shown by the attachment of an overflow pipe or spout, D, provided with a chamber, E, of a receiver, F, into which pipe d delivers. The main feed to the tilting-can or measurer G is made by or through an aperture, i, in quantity or bulk in the regular manner from the receiver F; but shortly before the filling of the can or giving tilting weight to it this main feed is shut off, and the finishing quantity of spirits to operate the can furnished in a fine or small stream from the overflow pipe D, which gives a more accurate action to the can than when the filling is finished in the same rapid manner as it was begun. To accomplish this there is connected with a beam, H, which has timely intermittent reciprocating motion given it by the working mechanism of the meter, a valvular box, I, which, coming down before the can has its tilting weight given it, stops the main feed from the receiver F, and restricts the further supply to the measurer from the overflow spout D, that empties into the valvular box I, from which the liquid is passed out by a small orifice or orifices in its bottom. After the one chamber of the can or measurer has been filled, and the latter tilted to effect the discharge from one chamber, and bring the next chamber in receiving position, the beam H lifts the valvular box I, to admit of the main feed being re-established.

The fourth feature of the invention is shown in operating the sample-taker J, each delivery of the measurer, by pivoting it to a carrier, j, deriving its motion from a pinion, k, which is operated by a rack, l, connected with the beam H, said sample-taker lifting spirits from the receiver F, or its chamber E, and discharging into the sample-can K (of which and sample-takers there may be any number) each time a quantity is passed to or through the meter by the measurer, so as to give in the sample-can or cans an average of the quality passed by the meter in a given time. The upper portion of the sample-can may be provided with a float-valve, m, to permit of the return or egress of volatile matter, and to establish uniformity with such in the other portions of the meter.

The fifth part of the invention consists in the arrangement of a check-valve, L, to the sample-can K, in such manner as that, while a sample may at any time be drawn from a pipe, n, on unlocking a box in which it is enclosed, no liquid can be returned, thus frustrating any attempt to inject water subsequently to one test and prior to another by a Government officer, thereby preventing false indications and fraud.

The sixth portion of the invention is shown by a detecting-valve, M, to (though it may be otherwise situated and constructed) the discharge opening o in the tank N, into which the measurer empties, said valve being held up or out of closing action on the opening o, when no tampering has been attempted, by a prop or catch, p, which, however, in the flooding of the meter by stoppage of the discharge, is made to tilt by the floating of it at one end, formed buoyant for the purpose, and, releasing support of the valve M, causes the latter to fall and close the opening o, said valve remaining closed and not capable of readjustment without unlocking the meter-case, thus forming a positive detector of attempted fraud.

The seventh feature of the invention consists in the combination with the meter, and arranged, say, in the tank N, of a float, O, operating an index, P, that, on any attempt to flood the meter, exposes the same by inspection of a dial, over which the index is moved by the rising of the float, thus leading to prompt discovery of tampering with the discharge.

The eighth part of the improvement is shown by the application of a roller-stop, Q, arranged to fit notches q in the measuring-can G, which stop serves to hold the measurer steady whilst being filled, but admits of and facilitates its free release, in a comparatively frictionless manner, on the depression of the beam R, which carries the measurer when the can is supplied with the necessary amount of liquid to tilt it. This secures accuracy in weighing or measuring, and consequently a perfect register of quantities.

The ninth feature of the invention is exhibited by the application to the registering apparatus of a meter of a shaft, S, having screw-threads r on it, of different pitch, arranged to gear with correspondingly-pitched worm-wheels T, for operating the various dials U, or their indices, which denote the multiples of the quantities required to be recorded by the registering apparatus. By this simple means a train of wheels and much complication may be avoided.

The tenth, eleventh, and twelfth features of the invention, which relate to the proof-tester, include, firstly, a worm or other can, A′, arranged to receive the spirits, say by a pipe, a′, in their passage to or through the meter, or as they are passed from the same, said can being hung on the one arm of a scale-beam, B′, having its fulcrum as at b′, and counterbalancing by its weight, or by a weight placed thereon, the can with its contents as the latter are kept up to the level of overflow orifices c′, and are of the least specific gravity likely to be tested by the apparatus, but which beam, or the arm of it on the opposite side of the fulcrum, to which is arranged the can A′, rises as the specific gravity of the contents of the can increases, and lifts, according to the weight in the can by the variation in specific gravity of its contents, one or a series in succession of independent weights, till the can and its contents are balanced. According to the number of independent weights thus raised, which action partakes of the character of a spring-balance, but is more accurate, is the specific gravity or strength of the spirits passing through the meter determined, and which, taken in connection with the register given of quantities passed, will give the quantity at a fixed or average quality or strength by causing the beam, as it rises or falls, and lifts more or less of the independent weights, accordingly as the liquid contains more or less alcohol, to actuate, by any suitable mechanism, a registering apparatus of varying specific gravities within a given time, such registering action of the proof-tester being under the control of the registering apparatus of quantities connected with the meter, so that every indication made of quantity passed will be accompanied by a record of strength or "proof;" and by the two records thus given an average proof may be struck of the entire quantity passed in a given time. The independent weights, lifted by or controlling the action of the beam B′ as the latter is influenced by the fluctuating specific gravities of the liquid, may be variously connected with or operated by it, to give them, as it were, an automatic or self-adjusting character. Thus they may be attached by chains of different lengths, so as to be lifted successively, or may be arranged as represented in the drawing, where the independent weights d′ are supposed to lie in notched inclined racks e′, and lifted or released in succession by a notched construction of the end of the beam working within said racks as the beam is vibrated by the varying specific gravities of the can's contents.

Where the spirit or liquid is of a fixed temperature this action of the proof-tester will furnish a correct record; but as the temperature of the spirits of the same proof and specific gravity is subject to change it becomes necessary to provide for or against alteration in weight, consequent upon change in temperature, for a given or fixed volume, such as is covered by the weighing capacity of the can. To meet this difficulty I combine with a proof-tester a thermometric attachment or weight-adjuster, C′, which will aid the action of the same when the volume in the can A′ is of less weight by reason of an increase in temperature of its contents, and will retard the action of the same when the said volume is of greater weight from the same cause, and will thus influence the action of the tester in an equal ratio or proportion with or according to the alteration in weight of the volume. This thermometric weight-adjuster may be variously constructed. Thus it may be a cylinder containing mercury, over which the spirits may be allowed to run, and the mercury in which, as it fluctuates by a variable heat thus communicated to it, be made to operate a rod that will adjust further to or closer from the fulcrum of the beam B′ an independent weight to the latter; or, the same result may be obtained by immersion in the contents of the can A′ of a cylinder containing air, and connected with the beam in such a manner as that the expansion or contraction of the air in said cylinder, consequent upon the varying temperature of the liquid, will similarly or otherwise adjust an independent weight to the beam relatively to its fulcrum.

As already specified, the registering action of the proof-tester should be under the control of the registering apparatus of the meter, which indicates quantities. The following is a simple and efficient means for carrying out such connection: D′ is a frame, on which may be arranged the indicating-dial E′ of specific gravities, and which has arranged for travel across or within it a reciprocating frame, F¹, that is operated once towards and from the outer end of the beam B′, each stroke made by the registering apparatus of quantities, with which it may be connected and driven by a yoke, F². This frame F¹ has attached to it a lever, f′, that, by means of a friction-griper, gives motion in one direction only to the registering-index or dial of specific gravities as said frame is reciprocated. Connected with this frame F¹, or rather to the index-operating lever f′, is a sliding-templet, G′, the motion of which is parallel to that of the frame F¹, with which it may reciprocate, being not only connected so as to operate the lever f′, but also attached by a spring, h′, to the frame F¹. This templet G′ has a peculiar construction on its outer face or edge, being, say, of a curvature struck from a centre below that of the fulcrum of the beam B′, so that, while the frame F¹ has a fixed length of stroke, the templet G′ varies in its stroke with the position of the end of the beam against which it strikes, the spring h′ admitting of such difference in action between the frame and templet. When the specific gravity of the contents of the can A′, or weight on that end of the beam, is light, and the beam down at its opposite end, then the templet, in the reciprocating action of the frame F¹, is not arrested by striking the end of the beam till it has performed a comparatively long stroke, and operated the lever f′ to make what may be termed a long record on the dial indicating specific gravities; but as the beam B′, under an altered influence on it of the can A′ and its contents, rises at the end next to the templet, the latter, by its configuration, has its motion sooner arrested and stroke shortened, giving a shorter record on the dial; or, it may be, when the beam B′ at its end next to the templet is raised to its extreme point, the motion of the templet is stopped altogether, and no register made of specific gravity, as the liquid in the can then will be water, or spirits of very low proof, and not necessary to record.

To prevent the concealment of holes which may be bored through the outer walls of a meter-safe for fraudulent purposes, I use enamelled iron, the enamel consisting of any of the various preparations of quartz, or glass fused or firmly attached to the surface of the metal. The various receivers and pipes within the meter I line with enamel, which is not affected by the spirit or acid developed by the process of distillation.

What I here claim, and desire to secure by Letters Patent, is—

1. The connection, substantially as herein described, of the meter with the worm of the still, by means of a blow-off pipe of close character, and provided or operating with a valve that admits of expulsion of the air without giving motion to the measurer, but is self-closing on the flooding of the meter to prevent escape of the liquid at or through said pipe, as specified.

2. The overflow pipe or spout D, for operation in connection with the valvular box I, or its equivalent, to limit or regulate the finishing supply to the measuring-can or cans, essentially as herein set forth.

3. The combination of the beam H, rack $l$, and pinion $k$, for action of the sample-taker J, as described.

4. The application of a check-valve to the sample-can to prevent injection from the exterior, substantially as specified.

5. The combination with a meter of a detector-valve, M, of suitable description, for operation in the manner and for the purpose herein set forth.

6. The application to a meter of an index, operated by a float on any undue accumulation of liquid in the meter.

7. The combination of a roller-stop, Q, to the measurer G of a meter, essentially as and for the purpose herein set forth.

8. In the registering apparatus of a meter, communicating motion to the several indices, which denote the multiples, by means of a shaft, S, having screw-threads $r$ of different pitch, and gearing with worm-wheels T of corresponding pitch.

9. The application to a meter of a proof-tester, for operation in connection with the registering apparatus of quantities, and serving, by means of a weighing-can, beam, and independent weights, or their equivalents, to actuate a suitable registering apparatus of specific gravities, essentially as specified.

10. The attachment to a proof-tester, operating substantially as described, of a thermometric weight-adjuster, for automatically adjusting said tester to the variation in weight of a given volume of liquid by fluctuations in the temperature of the latter affecting its specific gravity, substantially as specified.

11. Controlling the registering apparatus of specific gravities by means of a templet, G', operating in connection with devices in gear with the registering apparatus of quantities in a meter, essentially as herein set forth.

12. I claim the use of enamelled iron or other metal in the construction of meter-safes, and for the receivers and conducting pipes of the same.

ISAAC P. TICE.

Witnesses:
John W. Coombs,
Joseph Bécsey.